US006341683B1

(12) United States Patent
Hattori et al.

(10) Patent No.: US 6,341,683 B1
(45) Date of Patent: Jan. 29, 2002

(54) MOVING WALK

(75) Inventors: Hiroyuki Hattori; Kenro Matsuo; Kouki Sato, all of Osaka (JP)

(73) Assignee: Fujitec Co., Ltd., Osaka (JP)

( * ) Notice: Subject to any disclaimer, the term of this patent is extended or adjusted under 35 U.S.C. 154(b) by 0 days.

(21) Appl. No.: 09/029,463

(22) PCT Filed: Apr. 11, 1996

(86) PCT No.: PCT/JP96/00998

§ 371 Date: Apr. 6, 1998

§ 102(e) Date: Apr. 6, 1998

(87) PCT Pub. No.: WO97/09266

PCT Pub. Date: Mar. 13, 1997

(30) Foreign Application Priority Data

Sep. 6, 1995 (JP) .......................................... 7-255513
Dec. 7, 1995 (JP) .......................................... 7-345598

(51) Int. Cl.[7] .............................................. B65G 23/00
(52) U.S. Cl. ...................... 198/334; 198/324; 198/325; 198/792; 198/577
(58) Field of Search ............................... 198/334, 792, 198/577, 324, 325

(56) References Cited

U.S. PATENT DOCUMENTS

| | | | | | |
|---|---|---|---|---|---|
| 2,684,147 | A | * | 7/1954 | Holstebro | |
| 3,599,782 | A | * | 8/1971 | Whitfield | 198/347.1 |
| 3,665,863 | A | | 5/1972 | Patin | |
| 3,944,044 | A | | 3/1976 | Hamy | |
| 4,063,375 | A | * | 12/1977 | Satterwhite | 37/190 |
| 4,192,496 | A | * | 3/1980 | Baselice et al. | 271/10.07 |
| 5,044,485 | A | | 9/1991 | Loder | |
| 5,056,647 | A | * | 10/1991 | Rosenbaum | 198/460.1 |
| 5,125,497 | A | * | 6/1992 | Sundermann | 198/463.3 |
| 5,234,095 | A | | 8/1993 | Patin | |
| 5,341,914 | A | * | 8/1994 | DeMars et al. | 198/418.6 |
| 5,361,706 | A | | 11/1994 | Kunczynski | |
| 5,538,124 | A | * | 7/1996 | Loder | 198/324 |
| 5,692,593 | A | * | 12/1997 | Ueno et al. | 198/369.2 |
| 5,695,042 | A | * | 12/1997 | Burgt et al. | 198/600 |
| 5,971,129 | A | * | 10/1999 | Stawniak et al. | 198/325 |

FOREIGN PATENT DOCUMENTS

| | | |
|---|---|---|
| JP | 5259392 | 4/1977 |
| JP | 5224312 | 6/1977 |
| JP | 5237106 | 8/1977 |
| JP | 5844149 | 10/1983 |
| JP | 6422793 | 1/1989 |
| JP | 1150688 | 6/1989 |
| JP | 08 165083 | 6/1996 |

* cited by examiner

*Primary Examiner*—Christopher P. Ellis
*Assistant Examiner*—Richard Ridley
(74) *Attorney, Agent, or Firm*—Jordan and Hamburg LLP

(57) ABSTRACT

A moving walk for effecting transport in a longitudinal direction includes a series of belt modules with modules at a center portion running at a higher rate than modules at exit ends. Among the belt modules are at least first and second belt modules, each having a first end and a second end, a endless belt extending from the first end to the second end, and a drive circulating the endless belt. The first and second belt modules are disposed adjacent one another in the longitudinal direction with the second end of the first belt module opposing the first end of the second belt module. The second end of the first belt module is disposed higher that the first end of the second belt module when a passenger is transported from the first belt module to the second belt module to facilitate transition from module to module.

14 Claims, 19 Drawing Sheets

MOVING WALK

BACKGROUND

The present invention relates to a moving walk which can safely and rapidly transfer a passenger over a long distance.

For example, in the case of a moving walk disposed in a place such as an airport, when it is driven at a speed of 30 m per minute or 40 m per minute, there has been a problem that it takes too long to move the passenger due to the low speed.

Then, a new type of moving walk which slowly moves at a platform for the passenger and fast moves at a middle portion has been desired, and a moving walk as shown in the following description has been suggested in Japanese Patent Kokai Publication No. 2-75594.

FIG. 2 is a schematic view which shows a moving walk constituted by a plurality of endless circulating belts, and FIG. 3 is a partly enlarged view of FIG. 2.

In the drawing, reference numerals 2 and 2' denote an independent module which is structured such that an endless sliding belt 20 having a small thickness and being significantly flexible passes under a pair of guide rollers 25 and is always driven by a drive roller 30 at a constant speed, and it is set that among them, a module 2 disposed near the platform moves at a low speed and a module 2' disposed at a position apart from the platform moves at a high speed as it is apart from the platform, so that a passenger is gradually accelerated or decelerated when the passenger transfers to the adjacent modules 2 and 2'.

Accordingly, the module 2 has a platform belt and the module 2' has an accelerating and decelerating belt.

Reference numeral 15 denotes a small diameter roller disposed at both ends of the module 2 or 2' in such a manner as to be apart therefrom and having a significantly small diameter, for example, about 30 mm to 70 mm, and an effective interval between the adjacent portions in an above track is restricted to a size of about 20 mm to 40 mm, smaller than a length of a very small shoe such as a child shoe.

Reference numeral 10 denotes a transfer plate having a T-shaped cross section and disposed in an interval between each pair of the adjacent modules 2 or 2' in such a manner that the above surface is positioned lower than the upper surface of the endless sliding belt 20, and it is described that the transfer body 10 may be omitted in the case that the circulating speed of the endless sliding belt is high.

Reference numeral 26 denotes a sliding plate for supporting and guiding the above track of the endless sliding belt 20, and reference numeral 27 denotes a long main circulating belt moving at a highest speed in an adjacent manner to the high speed module 2' and constituting a center portion of the moving walk.

However, in the case of the conventional variable speed type moving walk mentioned above, there have been the following problems.

1) A mechanism for driving the belt in each of the modules in a relational manner becomes complex.

2) Since the belt is always supported and guided by the sliding plate, even in the case that there is no passenger, a loss is produced due to a sliding friction.

3) It is not completely made clear how long and what speed of the module is optimum and what combination of the modules is optimum, for safety of the transferred passenger, or how a moving handrail for safely guiding the passenger is arranged.

4) The lower the circulating speed of the endless sliding belt 20 is, the smaller the interval between the opposing small diameter rollers 15 have to be made, however, when the transfer plate 10 is inserted, the interval is made wide, so that there is a risk that the passenger transferred in a standing attitude slips on a rotating portion at the small diameter roller 15 of the endless sliding belt 20 close to a receiving side, thereby obstructing a smooth transfer,. Further, when the length of the modules 2 and 2' in an accelerating and decelerating area is too short, it is considered that a tall passenger completely steps over one module in one stride, in this case, the passenger suddenly moves from the slow endless sliding belt to the endless sliding belt moving at a faster speed (or the reversed case), so that the passenger staggers and it is very dangerous.

The present invention is made by taking each of the problems mentioned above into consideration, and an object is to provide a variable speed type moving walk having a simple structure and mechanism, capable of safely and smoothly transferring a passenger, presenting little fear of stumbling when the passenger walks.

SUMMARY OF THE INVENTION

The present invention is made by taking the problems mentioned above into consideration, and is characterized by including the following structures.

(1) A moving walk structured such that an independent platform belt and one or some accelerating and decelerating belts are successively disposed adjacent to an operating direction in front of and at the rear of a main circulating belt, the belts are operated in the same direction, an operating speed of the belt disposed at a boarding portion is successively made high in accordance that the belt reaches a moving direction, an operating speed of the belt disposed at a debarking portion is successively made low in an inverted manner, and an operating speed of the main circulating belt is made highest with respect to the belts at the embarking and debarking portions, in which:

a) the belt disposed at the debarking portion or the belt disposed at the boarding portion is driven through the main circulating belt; and/or, b) a moving body for absorbing an extension and compression of the main circulating belt is provided in a returning end of the main circulating belt in such a manner as to freely move in a longitudinal direction of the main circulating belt.

(2) The moving body for absorbing an extension and compression of the transferring belt is provided in a returning end of the transferring belt wound around two spaced apart rollers in an endless manner in such a manner as to freely move in a longitudinal direction of the transferring belt.

(3) In the structure in which an above track of the transferring belt wound around two spaced apart rollers in an endless manner is supported and guided by a sliding plate, a hole is provided in the sliding plate and a partly guiding member is provided in the hole in such a manner as to freely project.

(4) In the structure in which at least two sets of modules provided with a first roller and a second roller disposed apart from each other and having a small diameter, drive means, and an endless belt passing over the first roller and the second roller and driven by the drive means are closely disposed in series with respect to a longitudinal direction in such a manner that the first roller and the second roller are opposed:

a) at least one of the opposing first roller and second roller is supported in such a manner as to freely move to a vertical direction; and/or, b) a center portion of at least one of the modules is supported in such a manner as to freely rotate, a member to be guided is provided in a lower surface near the first roller and the second roller, and the member to be guided is guided and supported by a movable support body having a projecting portion; and/or, c) a length of each of the modules is set to be a length which cannot be stepped over in one stride even by a tall passenger.

(5) In the structure in which at least two sets of modules provided with a first roller and a second roller disposed apart from each other, drive means, and an endless belt passing over the first roller and the second roller and driven by the drive means are disposed in series with respect to a longitudinal direction, and the endless belt of each of the modules is circulated at a different speed, a) a moving handrail moving at about an average speed of the endless belts circulating at different speeds is disposed at both side portions of each of the modules; or, b) a moving handrail is disposed at both side portions of each of the modules, and the moving handrail is moved at a speed which cancels a leading action and a lagging action of the transferred body with respect to the transfer at the length and the circulating speed in the endless belt of each of the modules.

In accordance with the invention having the structure mentioned above, a belt system in which the circulating belt, having a necessary speed, can be efficiently obtained from a single drive source or a limited number of drive source, and even when the length of the belt becomes long, a suitable tension can be always obtained, further, since the moving handrail is disposed in such a manner that the leading action and the lagging induction operation can be appropriately canceled with respect to the movement of the passenger by the circulating belt and each of the circulating belts is relatively disposed in such a manner that the passenger can be transferred from the sending side to the receiving side between the modules in a smooth manner. Accordingly, a moving walk which is trouble free even when the operating direction becomes inverted can be obtained.

Further, a safe moving walk presenting little fear of stumbling or staggering even when the passenger walks on the belt with long strides can be obtained.

BEST MODE FOR CARRYING OUT THE INVENTION

As mentioned above, the invention provides a structure and a mechanism for a moving walk for smoothly transferring a passenger, and an embodiment in accordance with the invention is described below with reference to the drawings, however, the invention is not limited to these embodiments.

Figure 1:
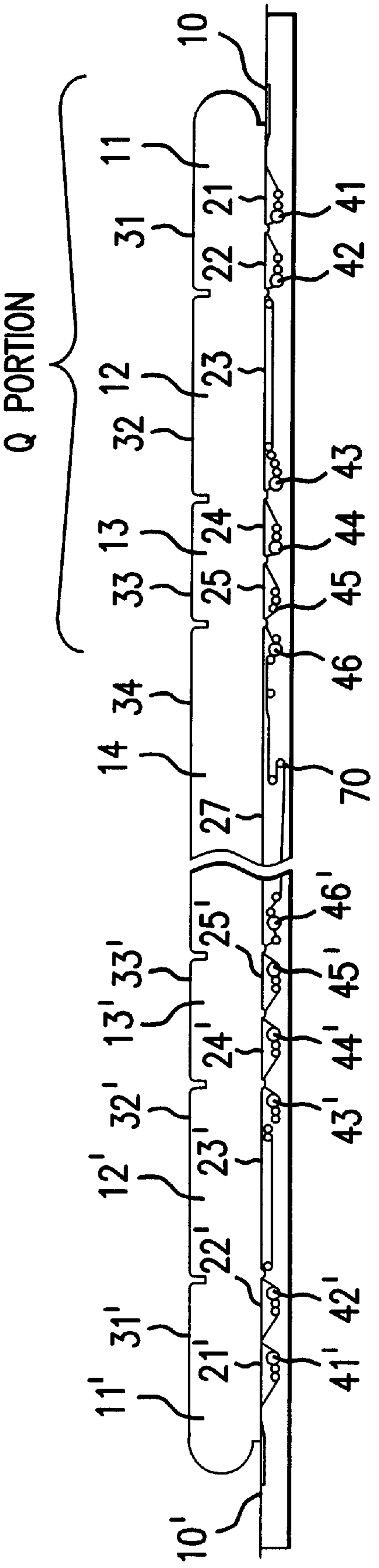
FIG. 1 is a side elevation view which shows an overview of an embodiment in accordance with the invention.
Figure 2:
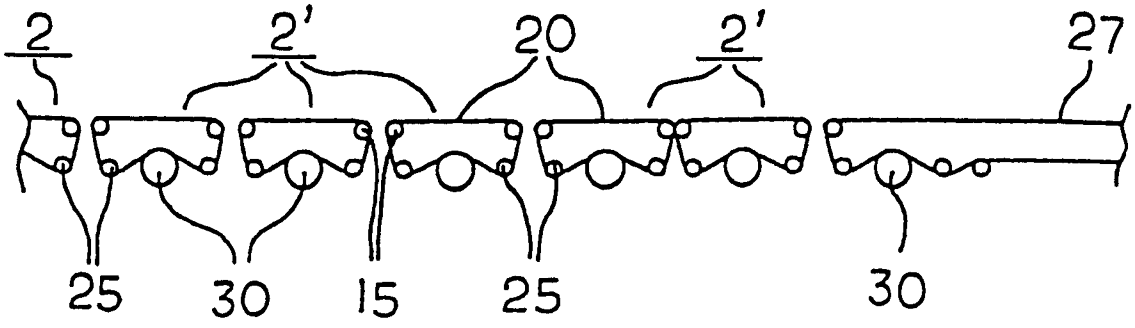
FIG.2 PRIOR ART
FIG. 2 is a schematic view which shows a conventional moving walk.
Figure 3A:
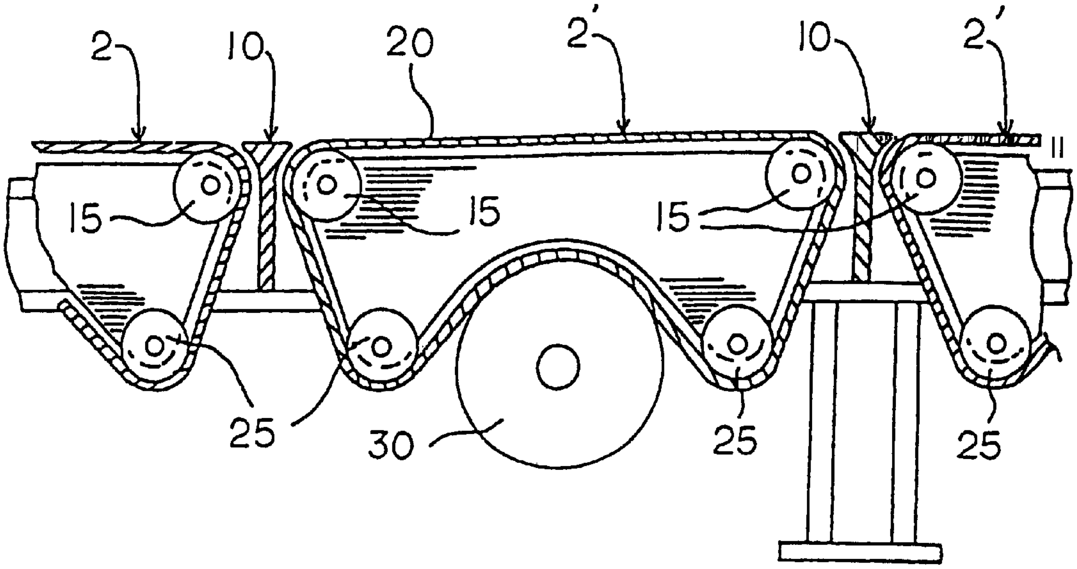
FIG. 3a PRIOR ART
FIG. 3 is a partly enlarged view of FIG. 2.
Figure 3B:
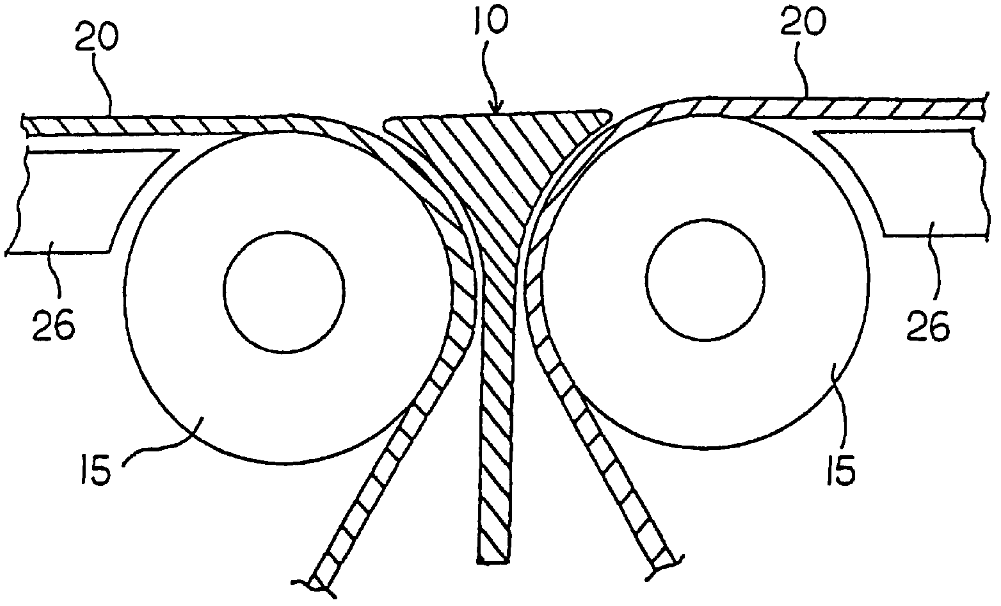
FIG. 3b PRIOR ART
Figure 4:
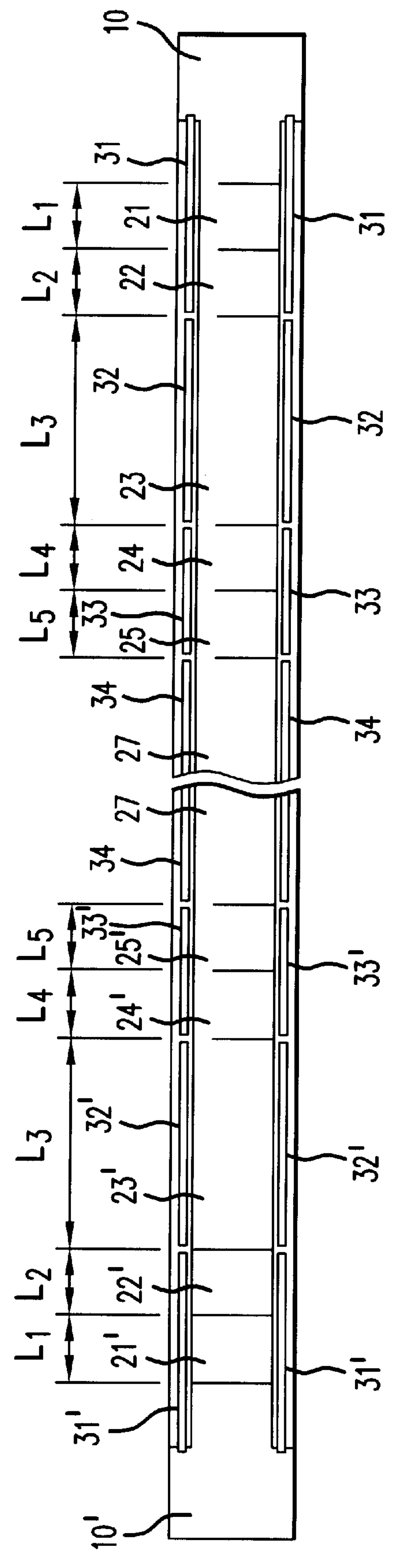
FIG. 4 is a plan view of FIG. 1.

FIG. 1 is a side elevation view which shows an overview of an embodiment in accordance with the invention, and shows a relation of an arrangement between belts and moving handrails. FIG. 4 is a plan view of FIG. 1, FIGS. 5(*a*) and 5(*b*) show a drive mechanism for each of the belts in FIG. 1, FIGS. 6(*a*) and 6(*b*) are an enlarged views of a portion P in FIGS. 5(*a*) and 5(*b*), and FIGS. 7(*a*) and 7(*b*) are enlarged views of a supporting and guiding mechanism for a belt. In the drawings, reference numeral 11 denotes a balustrade panel provided in a standing manner on both side surfaces in such a manner as to extend over a platform belt 21 (moving at a speed of V1 in a circulating manner) facing a floor plate 10 disposed in a platform portion of a moving walk and a first endless sliding belt 22 (moving at a speed of V2 in a circulating manner) disposed adjacent to the platform belt 21, and reference numeral 31 denotes a moving handrail provided in such a manner as to surround a periphery of the balustrade panel 11.

Reference numeral 12 denotes a balustrade panel provided in a standing manner on both side surfaces of a second endless sliding belt 23 (moving at a speed of V3 in a circulating manner), and reference numeral 32 denotes a moving handrail provided in such a manner as to surround the periphery of the balustrade panel 12.

Reference numeral 13 denotes a balustrade panel provided in a standing manner on both side surfaces in such a manner as to extend over a third endless sliding belt 24 (moving at a speed of V4 in a circulating manner) and a fourth endless sliding belt 25 (moving at a speed of V5 in a circulating manner) disposed adjacent thereto, and reference numeral 33 denotes a moving handrail provided in such a manner as to surround a periphery of the balustrade panel 13.

Reference numeral 14 denotes a balustrade panel provided in a standing manner on both side surfaces of a main circulating belt 27 (moving at a speed of V6 in a circulating manner), and reference numeral 34 denotes a moving handrail provided in such a manner as to surround the periphery of the balustrade panel 14.

Reference numeral 11' denotes a balustrade panel provided in a standing manner on both side surfaces in such a manner as to extend over a platform belt 21' (moving at a speed of V1 in a circulating manner) facing a floor plate 10' disposed in an opposite side and a first endless sliding belt 22' (moving at a speed of V2 in a circulating manner) disposed adjacent to the platform belt 21', and reference numeral 31' denotes a moving handrail provided in such a manner as to surround a periphery of the balustrade panel 11'.

Further, reference numeral 12' denotes a balustrade panel provided in a standing manner on both side surfaces of a second endless sliding belt 23' (moving at a speed of V3 in a circulating manner), and reference numeral 32' denotes a moving handrail provided in such a manner as to surround the periphery of the balustrade panel 12'.

Still further, reference numeral 13' denotes a balustrade panel provided in a standing manner on both side surfaces in such a manner as to extend over a third endless sliding belt 24' (moving at a speed of V4 in a circulating manner) and a fourth endless sliding belt 25' (moving at a speed of V5 in a circulating manner) disposed adjacent thereto, and reference numeral 33' denotes a moving handrail provided in such a manner as to surround a periphery of the balustrade panel 13'.

Figure 7A:
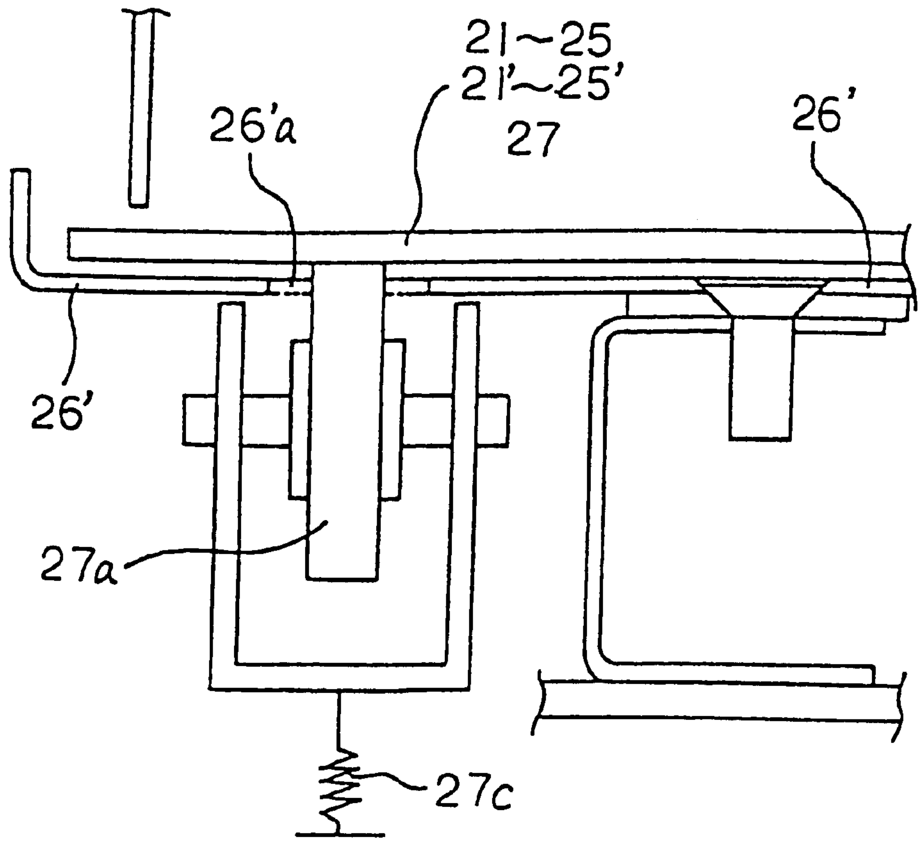
FIGS. 7(*a*) and 7(*b*) are enlarged views which show a supporting and guiding mechanism for a belt in accordance with the invention.
Figure 7B:
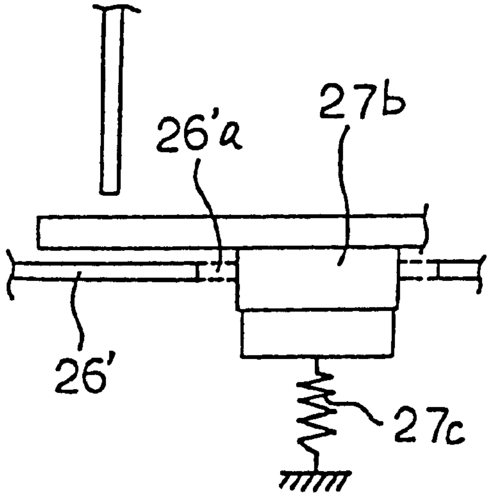

In all or a part of the platform belts 21 and 21', the endless sliding belts 22, 22', 23, 23', 24, 24', 25 and 25' and the main circulating belt 27, the above track is supported and guided by a sliding plate 26' in the same manner as that of the conventional structure. However, in the sliding plate 26', for example, as shown in FIG. 7, a hole 26'*a* is provided in some portions, and a partly guiding member, that is, a rotatable roller 27*a* or a low frictional sliding member 27*b* or the like is provided in the hole 26'*a* in such a manner as to freely project (by a spring pressure of a spring 27*c*), so that it is structured such that, in the case that the passenger does not ride on the belt (21 to 25, 21' to 25' and 27), the belt is guided by the partly guiding member so as to transfer with a significantly small frictional loss. On the contrary, in the case that the passenger rides on the belt, the partly guiding member is pressed downward so as to enter in the hole 26'*a*, whereby the belt is firmly guided on the sliding plate 26'.

Then, a number, a length and a moving speed V1 to V6 (having a relation of V1<V2<V3<V4<V5<V6) of the platform belts 21 and 21', the respective endless sliding belts 22, 22', 23, 23', 24, 24', 25 and 25' and the main circulating belt 27 are suitably set in accordance with the circumstances to provide graduated acceleration and a desired terminal speed of the main circulating belt 27.

Next, reference numeral 41 denotes a drive roller for the platform belt 21, reference numeral 42 denotes a drive roller for the first endless sliding belt 22, reference numeral 43 denotes a drive roller for the second endless sliding belt 23, reference numeral 44 denotes a drive roller for the third endless sliding belt 24, reference numeral 45 denotes a drive roller for the fourth endless sliding belt 25, reference numeral 46 denotes a drive roller for the main circulating belt 27, reference numeral 46' denotes a driven roller for the main circulating belt 27, reference numeral 45' denotes a drive roller for the fourth endless sliding belt 25', reference numeral 44' denotes a drive roller for the third endless sliding belt 24', reference numeral 43' denotes a drive roller for the second endless sliding belt 23', reference numeral 42' denotes a drive roller for the first endless sliding belt 22', and reference numeral 41' denotes a drive roller for the platform belt 21', respectively.

Figure 5A:
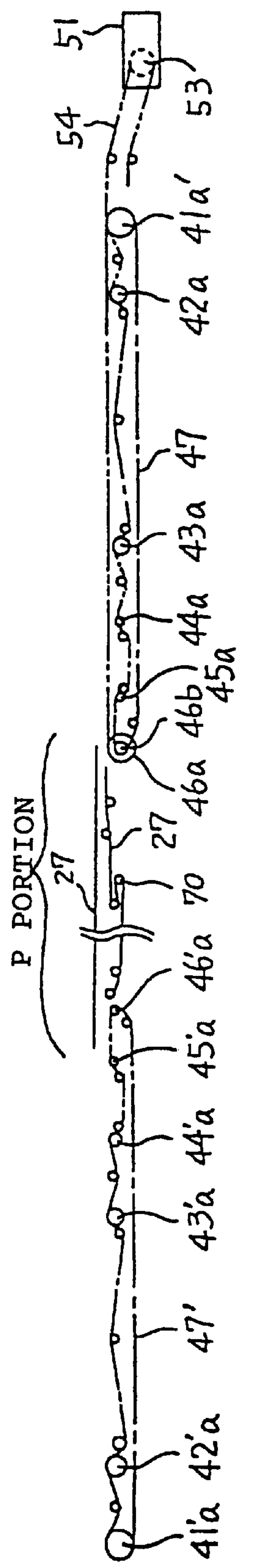
FIGS. 5(*a*) and 5(*b*) are overviews which show a drive mechanism for each of the belts in FIG. 1, in which (a) is a side elevation view and (b) is a plan view.
Figure 5B:
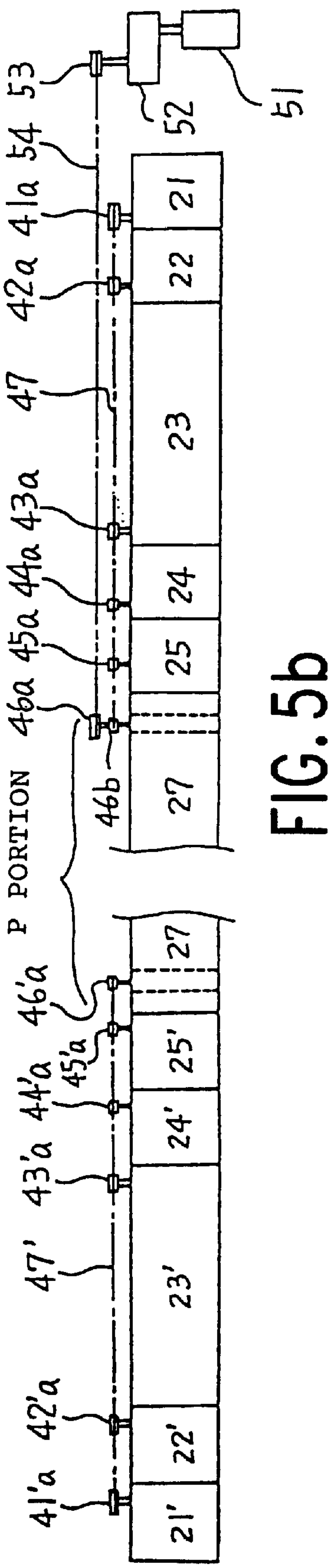

Further, in FIG. 5, reference numeral 51 denotes a drive apparatus for a moving walk arranged in a machine room, reference numeral 52 denotes a reduction gear connected to a shaft of the drive apparatus 51, reference numeral 53 denotes a sprocket driven by the drive apparatus 51 through the reduction gear 52.

Reference numeral 46*a* denotes a sprocket for a main drive which is rotatably provided in a coaxial manner with the drive roller 46 of the main circulating belt 27 and transmits power to the drive roller 46, and a main chain 54 is wound around the sprocket 53 and the sprocket 46*a*.

Reference numeral 41*a* denotes a sprocket which is rotatably provided in a coaxial manner with the drive roller 41 and transmits power to the drive roller 41, reference numeral 42*a* denotes a sprocket which is rotatably provided in a coaxial manner with the drive roller 42 and transmits power to the drive roller 42, reference numeral 43*a* denotes a sprocket which is rotatably provided in a coaxial manner with the drive roller 43 and transmits power to the drive roller 43, reference numeral 44*a* denotes a sprocket which is rotatably provided in a coaxial manner with the drive roller 44 and transmits power to the drive roller 44, reference numeral 45*a* denotes a sprocket which is rotatably provided in a coaxial manner with the drive roller 45 and transmits power to the drive roller 45, and reference numeral 46*b* denotes a sprocket which is rotatably provided in a coaxial manner with the drive roller 46 and the sprocket 46*a*, respectively, and a belt drive chain 47 is wound around each of the sprockets 46*b*, 45*a*, 44*a*, 43*a*, 42*a* and 41*a* so that it is structured such that a drive force of the sprocket 46*a* for the main drive is transmitted to each of the belts.

A diameter of the sprockets 41*a* to 46*a* and 46*b* is selected in accordance with the moving speed V1 to V6 of each of the belts.

On the contrary, reference numeral 41'*a* denotes a sprocket which is rotatably provided in a coaxial manner with the drive roller 41' and transmits power to the drive roller 41', reference numeral 42'*a* denotes a sprocket which is rotatably provided in a coaxial manner with the drive roller 42' and transmits power to the drive roller 42', reference numeral 43'*a* denotes a sprocket which is rotatably provided in a coaxial manner with the drive roller 43' and transmits power to the drive roller 43', reference numeral 44'*a* denotes a sprocket which is rotatably provided in a coaxial manner with the drive roller 44' and transmits power to the drive roller 44', reference numeral 45'*a* denotes a sprocket which is rotatably provided in a coaxial manner with the drive roller 45' and transmits power to the drive roller 45', and reference numeral 46'*a* denotes a sprocket which is rotatably provided in a coaxial manner with the driven roller 46', respectively, and a belt drive chain 47' is wound around each of the sprockets 46'*a*, 45'*a*, 44'*a*, 43'*a*, 42'*a* and 41'*a* so that it is structured such that a rotating force of the driven roller 46' is transmitted to each of the belts.

Accordingly, the power of the drive apparatus 51 is transmitted to the endless sliding belts 21', 22', 23', 24' and 25' through the main chain 54, the sprocket 46*a*, the drive roller 46, the main circulating belt 27, the driven roller 46', the sprocket 46'*a*, and the belt drive chain 47'. Then, in the sprockets 41'*a* to 46'*a*, a diameter in accordance with the moving speed V1 to V6 of each of the belts is selected.

Figure 6A:
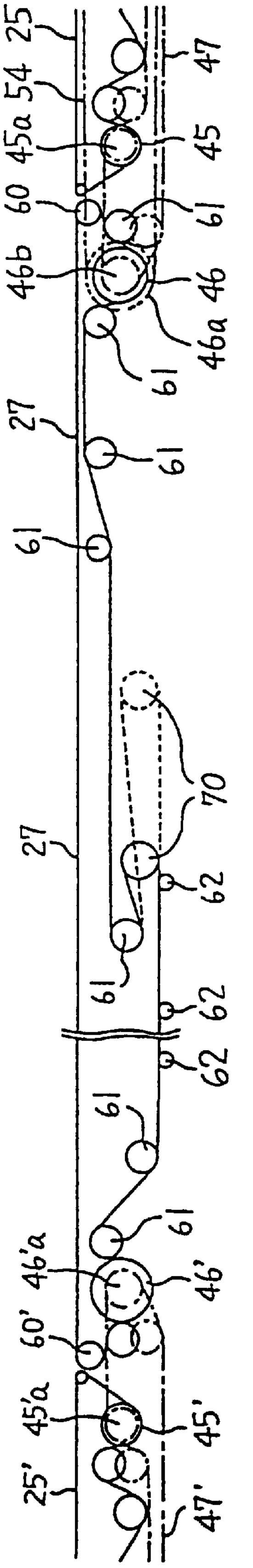
FIGS. 6(*a*) and 6(*b*) are enlarged views of a P portion in FIGS. 5(*a*) and 5(*b*), in which (a) is an enlarged view of FIG. 5(*a*) and (*b*) is an enlarged view of FIG. 5(*b*)
Figure 6B:
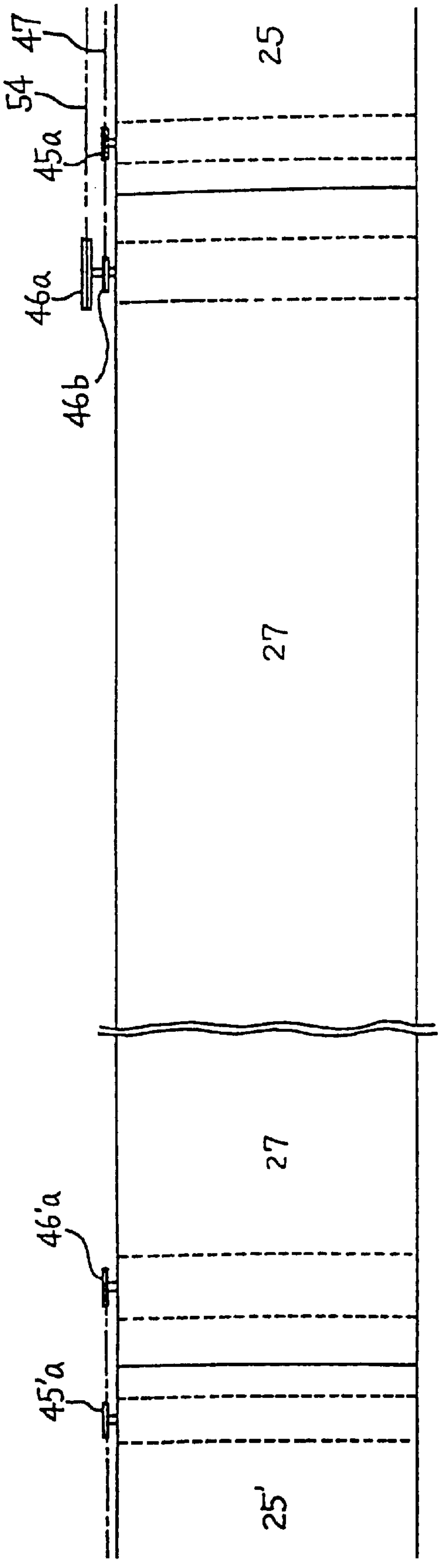

In this case, the main circulating belt 27 having the highest speed in the central portion of the moving walk is wound around rollers 60 and 60' rotatably disposed on both ends apart from each other as shown in FIG. 6, for example, having a diameter of about 80 mm, a returning portion thereof is wound around the drive roller 46 and the driven roller 46' disposed apart from each other and a middle portion thereof is guided by guide rollers 61 and 62.

Then, reference numeral 70 denotes a moving roller provided in such a manner as to freely move in a longitudinal direction of the belt, and this includes a tensioning apparatus for absorbing an extension and a compression of the main circulating belt 27 wound around there and adjusting a tensile force of the main circulating belt 27.

A length of the main circulating belt 27 is determined by a total length of the moving walk, however, for example, in the case that a distance of the transfer surface is about 100 m, even when an extension rate of the belt is supposed to be 2%, a condition that a size of about 2 m is required to be absorbed by the movement of the moving roller 70 exists.

Figure 8:
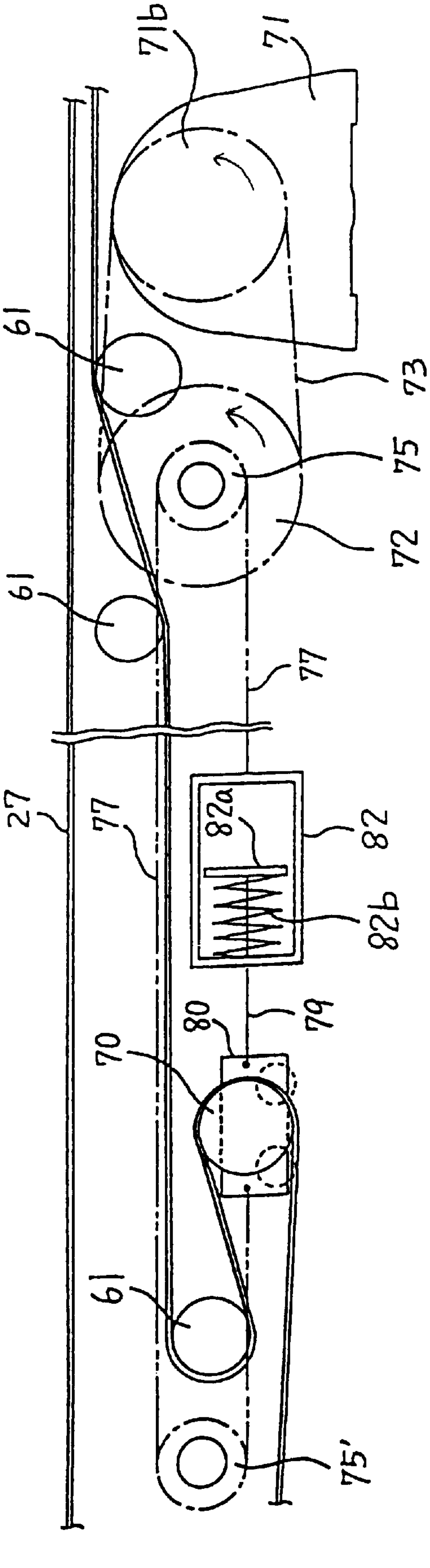
FIG. 8 is an enlarged view which shows a mechanism of a suitable tensioning apparatus for a main circulating belt 27 in FIG. 1 and FIG. 6.
Figure 9:
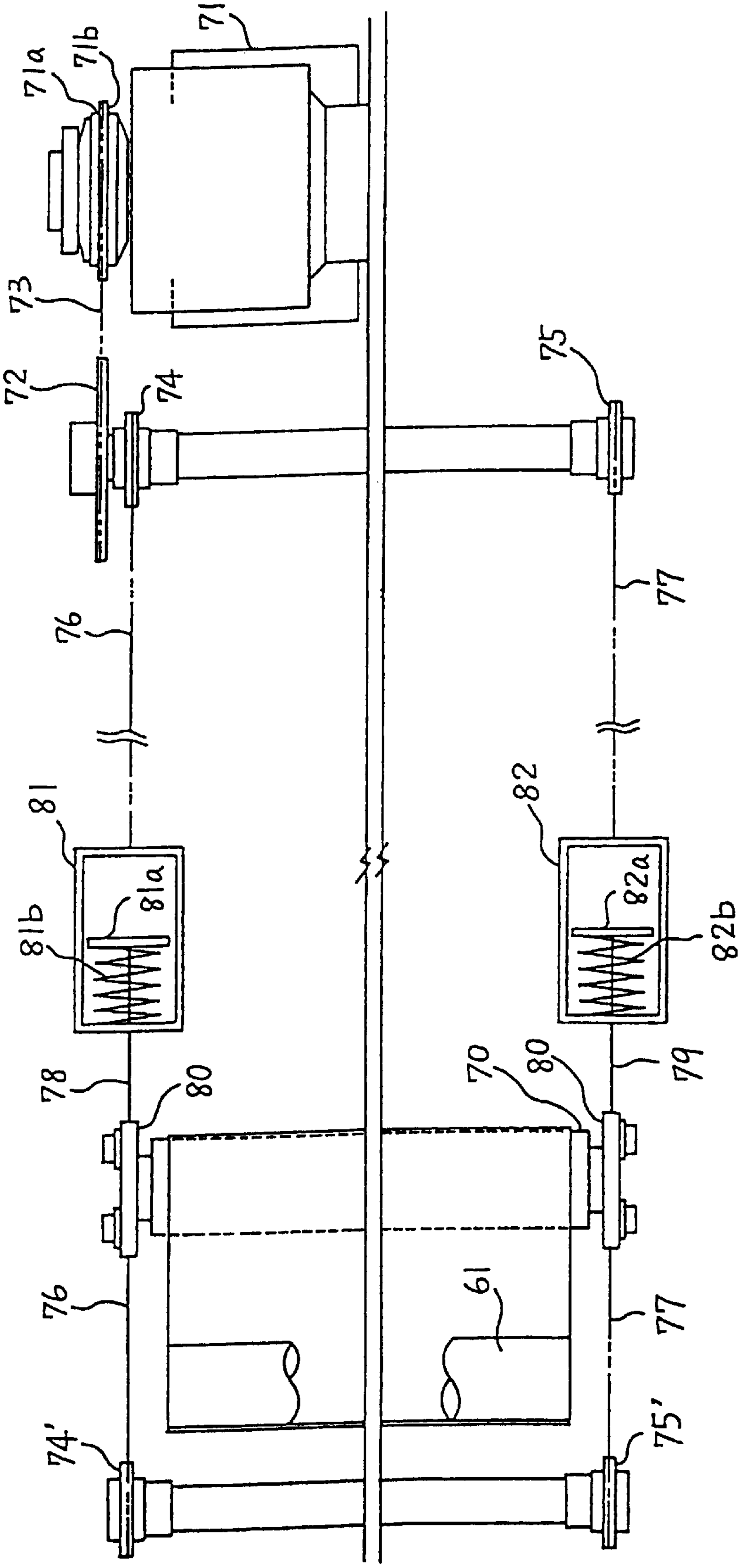
FIG. 9 is a plan view of FIG. 8.

Next, FIG. 8 is an enlarged view which shows a mechanism for absorbing an extension and a compression of the main circulating belt 27 in FIG. 1 and FIG. 6 and adjusting a tensile stress of the main circulating belt 27, and FIG. 9 is a plan view of FIG. 8.

In the drawings, the same reference numerals as those in FIG. 6 denote the same elements, reference numeral 71 denotes an electric motor with a torque limiter 71*a*, reference numeral 71*b* denotes a sprocket fixed to a shaft of the electric motor 71 through the torque limiter 71*a*, and reference numeral 72 denotes a sprocket rotatably provided in a space close to the moving roller 70, and a drive chain 73 is wound around the sprocket 71*b* and the sprocket 72.

Reference numerals 74 and 75 denote a pair of sprockets rotatably provided on both ends in a coaxial manner with the sprocket 72 and in a separated manner, and a pair of sprockets 74' and 75' are rotatably provided in a space opposite thereto with the moving roller 70 therebetween.

Reference numeral 76 denotes a chain wound around the sprockets 74 and 74', an end thereof is fixed to a moving body 80 with the moving roller 70, and the other end is fixed to a spring apparatus 81. The moving body 80 is structured such as to freely move to a horizontal direction (a longitudinal direction of the main circulating belt 27).

Reference numeral 77 denotes a chain wound around the sprockets 75 and 75', an end thereof is fixed to the moving body 80 with the moving roller 70, and the other end is fixed to a spring apparatus 82.

Reference numeral 78 denotes a rod member in which an end is fixed to the moving body 80 and another end is fixed to a moving piece 81*a* within the spring apparatus 81, and the moving piece 81*a* is restricted by a spring 81*b* installed therein.

Reference numeral 79 denotes a rod member in which an end is fixed to the moving body 80 and another end is fixed to a moving piece 82*a* within the spring apparatus 82, and the moving piece 82*a* is restricted by a spring 82*b* installed therein.

In the structure mentioned above, when the electric motor 71 is driven in such a manner that the sprocket 71*b* rotates to a counterclockwise direction in FIG. 8, the drive chain 73 is leftward circulated so as to rotate the sprocket 72 in a counterclockwise direction and rotate the sprockets 74 and 75, coaxially disposed, in a counterclockwise direction, so that the chains 76 and 77 are both circulated leftward so as to move the spring apparatus 81 and 82 in a rightward direction.

Then, the springs 81*b* and 82*b* within the spring apparatus 81 and 82 are compressed so as to press each of the moving pieces 81*a* and 82*a* in a rightward direction and move the moving body 80 through the rod members 78 and 79 in a rightward direction, so that the moving roller 70 is moved in the rightward direction so as to absorb slackness due to an extension of the main circulating belt 27, and when the moving roller 70 is further moved in the rightward direction, a tensile force necessary for the main circulating belt 27 can be generated.

In this case, when it is structured such that in the case that a predetermined limited torque is set by the torque limiter 71*a* (concretely speaking, is set by rotating the bolt) and the transmission plate installed therein is slipped, after detecting that, a supply voltage to the electric motor 71 is shut and a brake is operated, a necessary tensile force can be previously produced prior to the operation of the moving walk.

Accordingly, since the moving body 80, provided with the moving roller 70, is maintained in a state of being restricted by a spring force of the springs 81*b* and 82*b* of the spring apparatus 81 and 82, which are stopped at a predetermined position at a time of applying the brakes to the electric motor 71, the main circulating belt 27 is in a state that a predetermined tensile force is continuously applied during an operation of the moving walk.

Accordingly, even when the main circulating belt 27 itself is used for transmitting the power, no inconvenient matter is produced.

Since the moving direction of the moving body 80 is a horizontal direction, a great size of a unit of some meters can be naturally prepared, so that the depth of the total apparatus can be restricted to the utmost.

Further, in accordance with the structure of the apparatus mentioned above, during the stop of the moving walk, when the electric motor 71 is driven in such a manner as to rotate the sprocket 71*b* to a clockwise direction which corresponds to an opposite direction to that of the case mentioned above in FIG. 8, each of the members moves to the opposite direction to that of the case mentioned above and the moving body 80 is moved leftward, so that the tensioned state of the main circulating belt 27 can be canceled and an unnecessary tensile force can be canceled.

Accordingly, in the case of stopping the moving walk for a long time such as night and the like, since the unnecessary force is not applied to the main circulating belt 27, extension of the main circulating belt 27 itself can be restricted to the utmost.

Here, in the case that an excess tensile force is applied to the main circulating belt 27 during the operation of the moving walk, the transmission plate of the torque limiter 71*a* is slipped so as to serve to immediately release the excess tensile force.

By always checking a length of the spring 81*b* or 82*b* within the spring apparatus 81 or 82, the electric motor 71 is driven so as to increase the tensile force of the belt to a predetermined tensile force when the length of the spring becomes longer than a predetermined value (that is, when an extension is produced in the belt, concretely speaking, detected by a limit switch or the like), and an operation of always keeping the tensile force of the belt, during the operation, within a fixed range can be performed.

Further, in the case that the length of the spring becomes enough long to be returned to a natural length, it is determined that the belt is completely broken, then the drive of the belt itself is stopped so that it is possible to secure safety of the passenger.

As mentioned above, in accordance with the embodiment, the circulating belt having a necessary speed can be efficiently obtained from a single drive source or a limited number of drive sources, and a belt system in which a suitable tension can be always obtained even when the length of the belt becomes long can be constituted.

Next, as to each of the moving handrails 31, 32, 33, 34, 33', 32' and 31', the moving handrail 31 is moved in a circulating manner substantially at an average speed (V1+V2)/2 between the moving speed V1 for the platform belt 21 and the moving speed V2 for the first endless sliding belt 22, the moving handrail 32 is moved in a circulating manner at the same speed as that for the second endless sliding belt 23, the moving handrail 33 is moved in a circulating manner substantially at an average speed (V4+V5)/2 between the moving speed V4 for the third endless sliding belt 24 and the moving speed V5 for the fourth endless sliding belt 25, and the moving handrail 34 is moved in a circulating manner at the same speed as that for the main circulating belt 27.

Further, the moving handrail 31 ' is moved in a circulating manner substantially at an average speed (V1+V2)/2 between the moving speed V1 for the platform belt 21' and the moving speed V2 for the first endless sliding belt 22', the moving handrail 32' is moved in a circulating manner at the same speed as that for the second endless sliding belt 23', the moving handrail 33' is moved in a circulating manner substantially at an average speed (V4+V5)/2 between the moving speed V4 for the third endless sliding belt 24' and the moving speed V5 for the fourth endless sliding belt 25'.

In the moving walk in accordance with the invention, in order to make it possible to operate to the opposite direction, a replacing portion of the moving handrails 31, 32, 33, 34, 33', 32' and 31' and a connecting portion of the endless sliding belts 22, 23, 24, 25, 27, 25', 24', 23' and 22' are disposed in such a manner as to be just opposed.

For length L1 to L5 and the moving speed V1 to V6 (having a relation of V1<V2<V3<V4<V5<V6) of the platform belts 21 and 21' and the respective endless sliding belts 22, 22', 23, 23', 24, 24', 25 and 25', for example, a design value of L1=L2=L4=L5=830 mm, L3=2620 mm, V1=50 m/min, V2=62.4 m/min, V3=78.6 m/min, V4=99 m/min, V5=118.8 m/min and V6=150 m/min is considered. The length of the main circulating belt 27 is suitably set by taking the total length of the moving walk into consideration. In this case, since the module can be made common, the cost can be restricted to the utmost.

In the case that the length of the adjacent belts is equal, when the moving speed of the moving handrail is set substantially to an average value between the speed of the respective belts, the leading action and the lagging action can be substantially canceled with respect to the movement of the passenger by the belt.

Further, the respective length L1 to L5 of the platform belts 21 and 21' and the endless sliding belts 22, 22', 23, 23', 24, 24', 25 and 25' can be set to a different length, for example, L1=830 mm, L2=1040 mm, L3=2620 mm, L4=1650 mm and L5=1980 mm.

In this case, the module is less made common, however, the transfer time for the passenger on the platform belts 21 and 21', the first endless sliding belts 22 and 22' and the third and fourth endless sliding belts 24, 24', 25 and 25' is evened to about 1 second, so that when the moving speed for each of the moving handrails is set to be the average speed for the respective belts, the leading action and the lagging action can be theoretically canceled. Of course, the length of a step surface belt may be set in such a manner that all the transfer time for the passenger on the first to fifth endless sliding belts is even.

As mentioned above, the length of the belt and the moving speed of the moving handrail can be set in various patterns, however, it is preferable to set the length of the belt and the moving speed of the moving handrail in such a manner that a difference between the belt and the moving handrail is within 400 mm (the range within 16 inch is set as a recommendation by ANSI).

Figure 10:
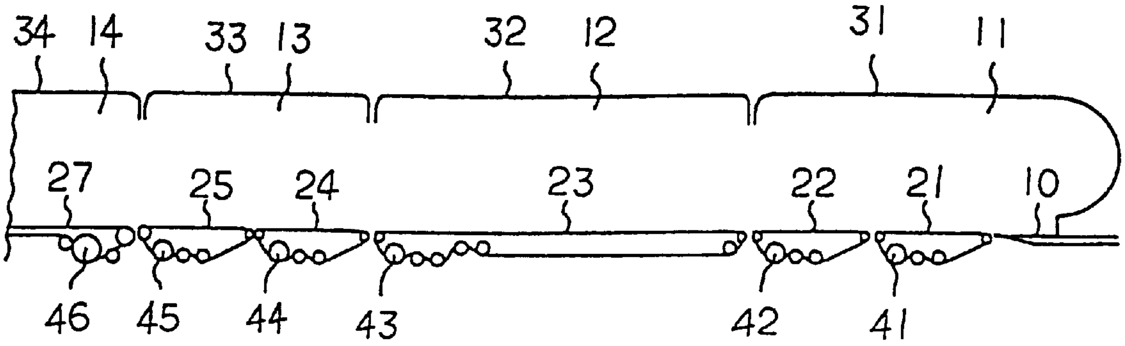
FIG. 10 is an enlarged view of a Q portion in FIG. 1.
Figure 11:
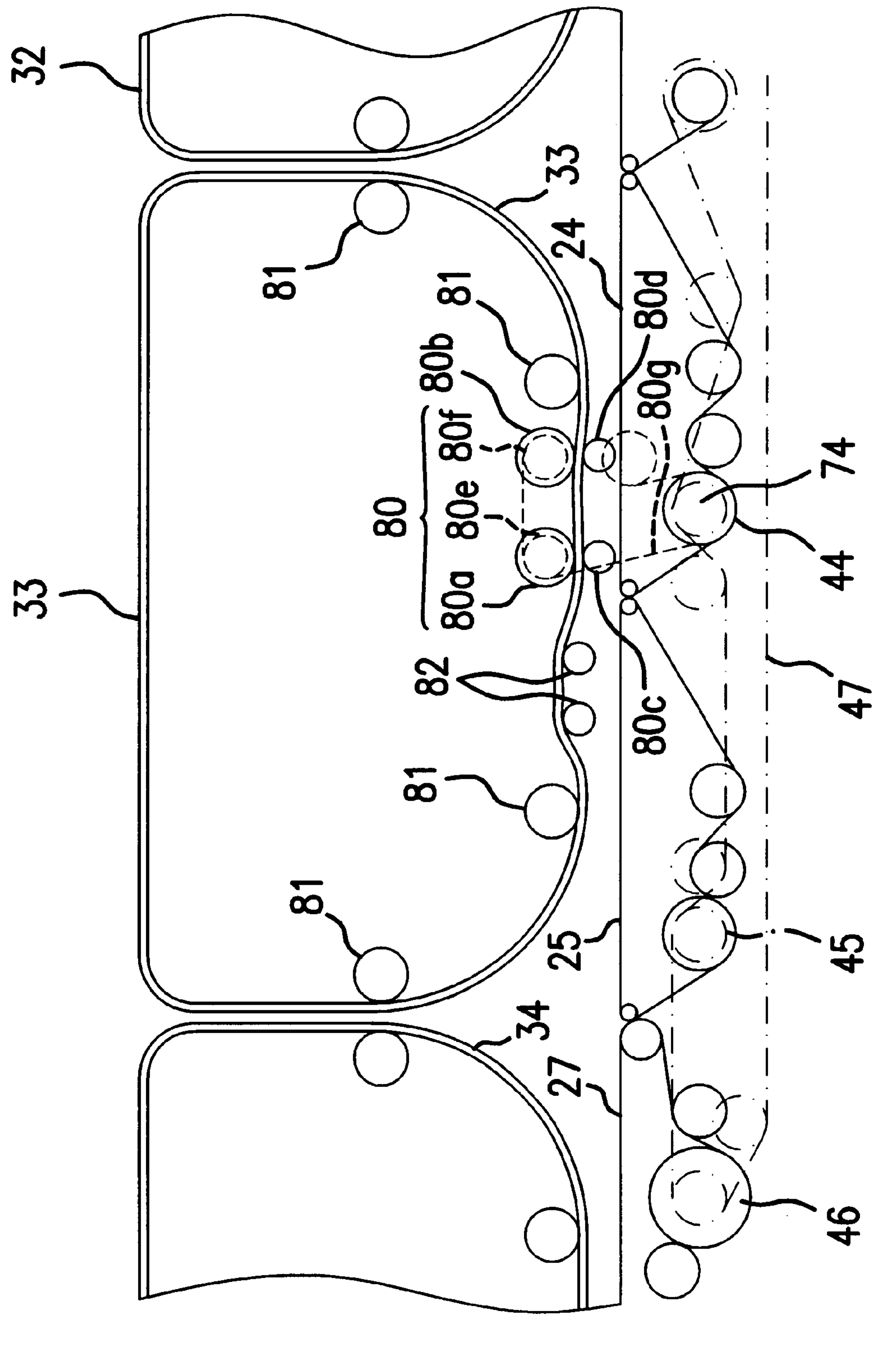
FIG. 11 is a view which shows a drive mechanism for third and fourth endless sliding belts 24 and 25 and a moving handrail 33.

Next, FIG. 10 is an enlarged view of a Q portion in FIG. 1 and FIG. 11 is a view which shows a drive mechanism for the third and fourth endless sliding belts 24 and 25 and the moving handrail 33, however, the opposite portion corresponding to the Q portion has the same structure and in the case of the platform belts 21 and 21', the first endless sliding belts 22 and 22' and the third and fourth endless sliding belts 24' and 25, the same drive mechanism is employed, so that detailed drawings are omitted.

In the drawings, the same reference numerals as those of FIG. 1, FIG. 5 and FIG. 6 denote the same elements, reference numeral 74 denotes a sprocket rotatably provided in a coaxial manner with the drive roller 44 mentioned above, and this serves to transmit the power to the moving handrail 33.

Reference numeral 80 denotes a known gripping and pressing drive apparatus for driving the moving handrail 33 by gripping and pressing, this includes drive rollers **80*a* and 80*b*, driven rollers 80*c* and 80*d* and sprockets 80*e* and 80*f* coaxially disposed with the drive rollers 80*a* and 80*b*, and a chain 80*g* transmitting power is wound around the sprockets 74, 80*e* and 80*f*. Then, it is structured such that the moving speed of the moving handrail 33 with respect to the endless sliding belt 24** is accelerated by suitably determining a diameter of each of the rollers and the sprockets.

Reference numeral 81 denotes a guide roller, and reference numeral 82 denotes a tension roller for adjusting a tensile force of the moving handrail.

Since the drive mechanism for the moving handrail 31 is performed by a speed increasing mechanism similar to a case mentioned above, the detailed explanation is omitted.

Further, a method of driving the endless sliding belt 23, the main circulating belt 27 and the moving handrails 32 and 34 is the same and it is sufficient to replace the diameter of the rollers and the sprockets by a uniform mechanism not accelerated, so that the detailed explanation will be omitted.

In accordance with the above structure, since the circulating belt of the moving handrail having a necessary speed can be obtained from a single drive source or a limited number of drive sources in a significantly simple manner, it is convenient. Further, since the moving handrail having a speed such as to cancel the leading action and the lagging action with respect to the movement by the circulating belt can be disposed on both side surfaces of the circulating belt, a preventative effect with respect to a turnover accident is significant.

As mentioned above, in accordance with the embodiment mentioned above, a variable speed type moving walk in which the moving handrail is disposed in such a manner as to suitably cancel the leading action and the lagging action with respect to the movement of the passenger by the circulating belt is provided. Even when the operating direction of the moving walk is inverted, no problem is produced.

Figure 12:
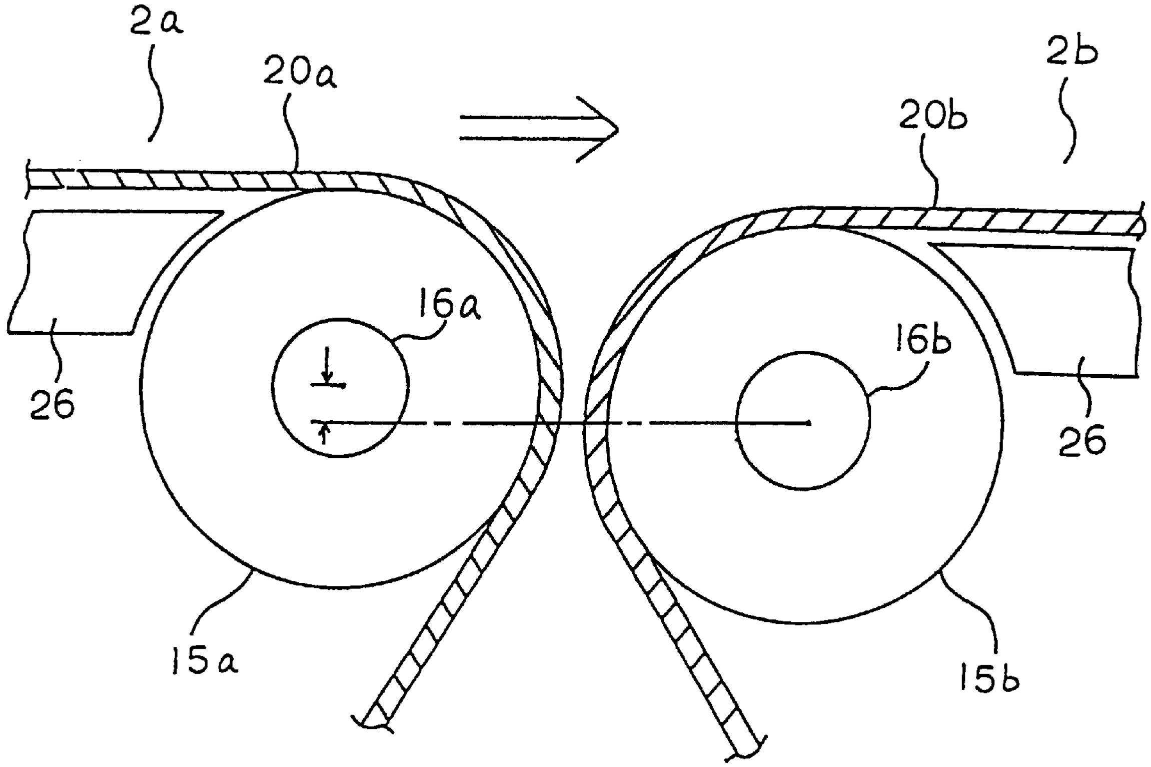
FIG. 12 is an enlarged view which shows a relation of an arrangement of a small diameter roller opposing in each of the modules in accordance with the invention.

Next, FIG. 12 is an enlarged view which shows a relation of an arrangement of a small diameter roller in accordance with the invention, reference numeral 15*a* denotes a small diameter roller in a module 2*a* at a sending end and reference numeral 15*b* denotes a small diameter roller in a module 2*b* at a receiving end. A height position of a central shaft 16*b* of the small diameter roller 15*b* is positioned at a position slightly lower than a height position of a central shaft 16*a* of the small diameter roller 15*a*, and the respective endless sliding belts 20*a* and 20*b* are disposed at different levels, so that the passenger passing through the interval can be smoothly transferred.

In this case, in the moving walk, it is preferable to optionally switch the moving direction in the same manner as the case of an escalator. However, when the height positions of the adjacent small diameter rollers are fixed so that a difference in level is initially provided, there is produced a problem that the passenger cannot be smoothly transferred to the inverted direction. Accordingly, when the height position of the small diameter roller can be finely adjusted in accordance with the operating direction of the moving walk, a moving walk having a significant usefulness is obtained.

Figure 13:
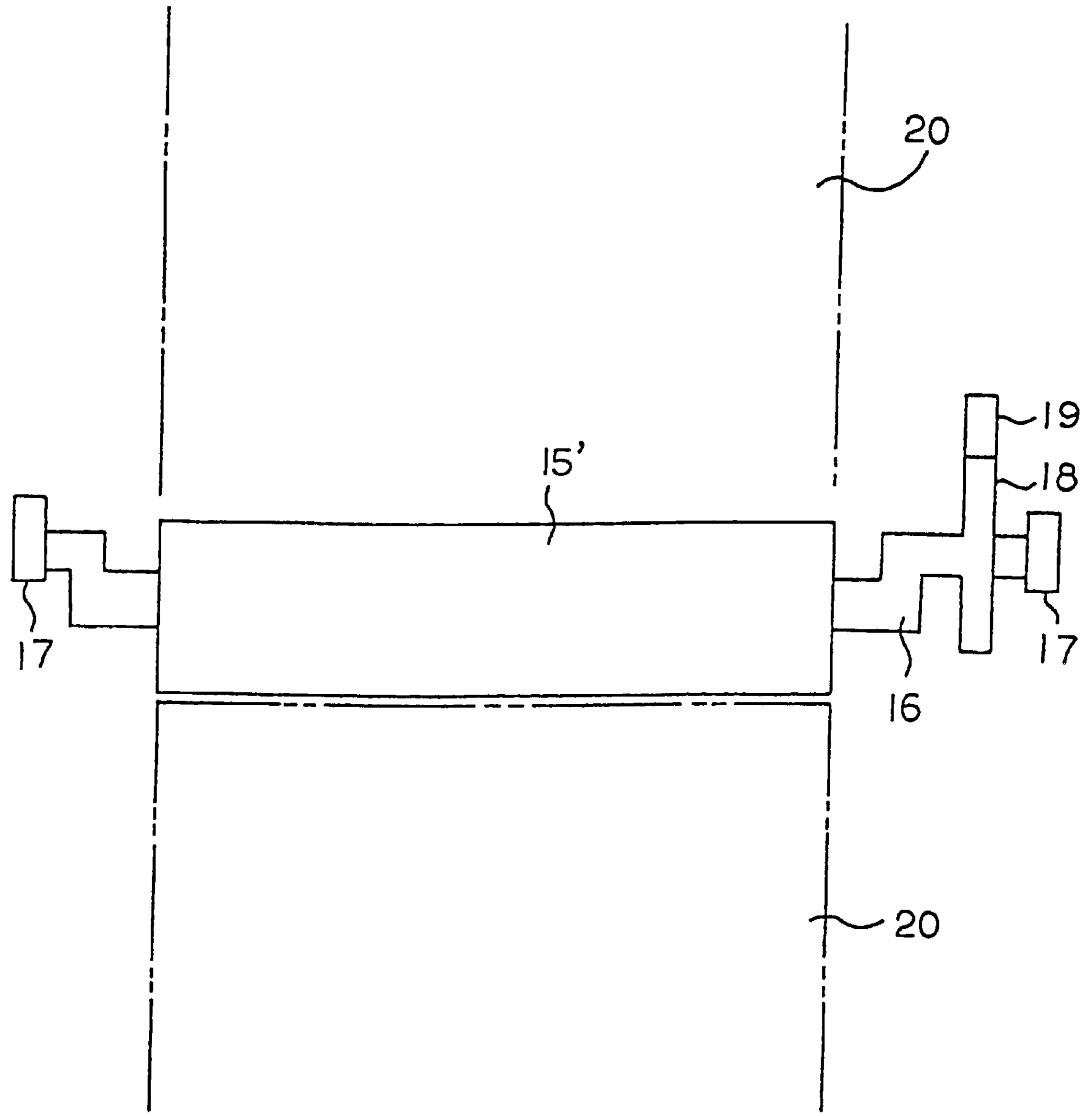
FIG. 13 is a view which shows a height position adjusting mechanism for the small diameter roller in accordance with the invention.
Figure 14A:
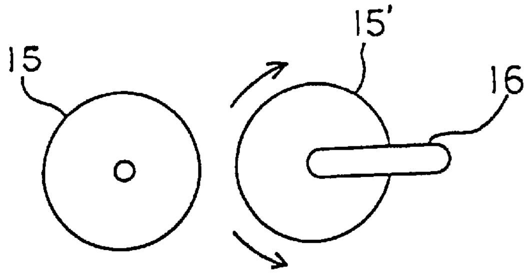
FIGS. 14(*a*)–14(*e*) are side elevation views which show a state of an eccentric shaft of the small diameter roller in accordance with an embodiment of the invention.
Figure 14B:
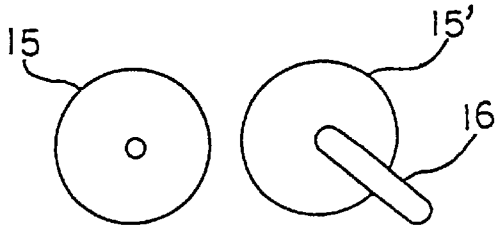
Figure 14C:
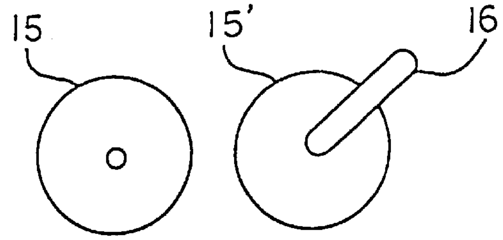
Figure 14D:
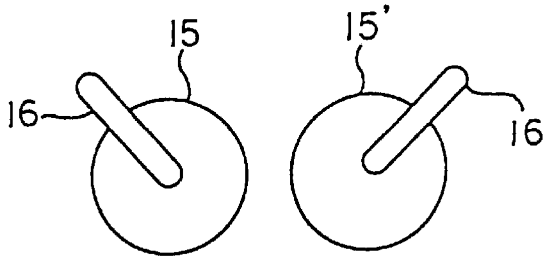
Figure 14E:
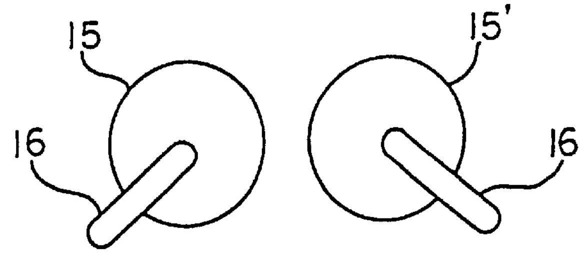

FIG. 13 is a plan view which shows an example of a mechanism for finely adjusting the height position of the small diameter roller.

In the drawing, reference numeral 15' denotes a small diameter roller in which a height position can be finely adjusted, the rotating shaft 16 of this small diameter roller 15' is eccentric at a degree of about a radial size of the small diameter roller 15', for example, to a horizontal direction, both ends thereof are rotatably supported by bearings 17. The small diameter roller 15' itself is rotatably mounted to the rotating shaft 16. A gear 18 is fixed to one end of the rotating shaft 16, and a small diameter gear 19 directly connected to a motor (not shown) is meshed with the gear 18.

Accordingly, it is sufficient that in the case that the small diameter roller 15' is in the receiving end, the rotating shaft 16 is rotated through the small diameter gear 19 and the gear 18 to the direction that the horizontal position is below the small diameter roller 15 of the opposing sending end, on the contrary, in the case that the small diameter roller 15' is in the sending end, the rotating shaft 16 is rotated a necessary amount to the direction that the horizontal position is above the small diameter roller 15 of the opposing receiving end.

In this case, since the tension degree of the endless sliding belt 20 is automatically adjusted by an idle roller in a known manner even when the position of the small diameter roller 15' is moved, there is no case that a problem is produced.

In accordance with the mechanism mentioned above, as to the difference in level between the small diameter roller 15' and the small diameter roller 15, it is significantly easy to adjust in accordance with the circulating speed of the endless sliding belt 20, that is, the higher the speed is, the smaller the difference in level is, and the slower the speed is, the relatively larger the difference in level is.

In the case that the rotating shaft 16 of the small diameter roller 15' is eccentric to the horizontal direction shown in FIG. 14(*a*) as in the embodiment, the small diameter roller 15' moves to the direction in which the interval between the small diameter roller 15' and the adjacent small diameter roller 15 slightly increases when the small diameter roller 15' is finely adjusted to any of the up and down directions. However, for example, by making the rotating shaft 16 eccentric to an oblique direction, it can be easily performed that at the same time of moving the small diameter roller 15' to the lower direction, the interval with respect to the adjacent small diameter roller 15 is further shortened (the case of FIG. 14(*b*)), or at the same time of moving the small diameter roller 15' to the upper direction, the interval with respect to the adjacent small diameter roller 15 is shortened (the case of FIG. 14(*c*)), so that it is convenient.

In the above explanation, the example in which only one of the opposing small diameter rollers is structured to be movable has been mentioned, however, it is possible to make both the opposing small diameter rollers a movable structure in a similar manner (for example, the case of FIG. 14(*d*) or FIG. 14(*e*)) so that more fine adjustment can be performed. Further, it is possible to structure the small diameter roller in such a manner as to freely move in a rotatable manner through the longitudinal bracket using an oil hydraulic apparatus.

On the contrary, a length of one of the modules 2 and 2' in accordance with the invention is set to be a length which even the tall passenger cannot step over in one stride. Thus, a moving walk in which a plurality of modules 2 and 2' are disposed in series provides a safe moving walk on which a passenger is smoothly accelerated and decelerated by successively riding adjacent modules 2 and 2' such that any passenger walks on the moving walk is accommodated. A step of a person is about 600 mm on average, even in the case of a tall person of 180 cm in height, it is considered that the step is not perhaps over 800 mm.

Accordingly, it is judged that a standard of the length of the module is considered to be set about 800 mm.

Figure 15A:
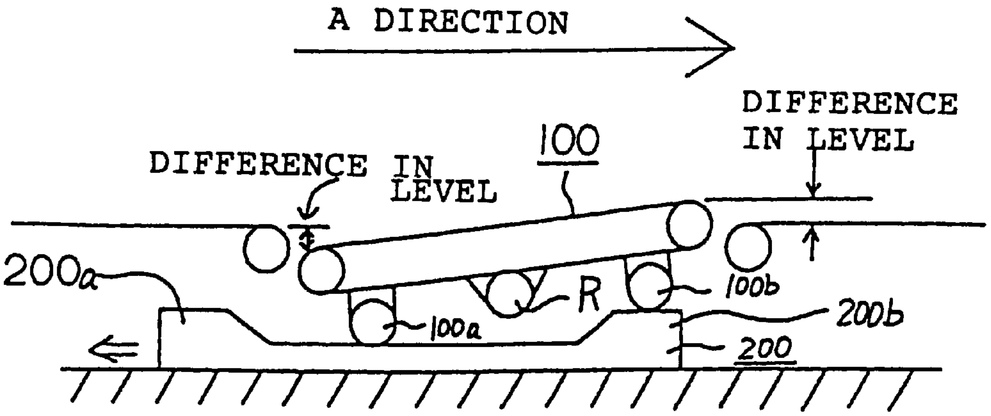
FIGS. 15(*a*) and 15(*b*) are side views which show another mechanism for finely adjusting a height position of the small diameter roller in accordance with the invention.
Figure 15B:
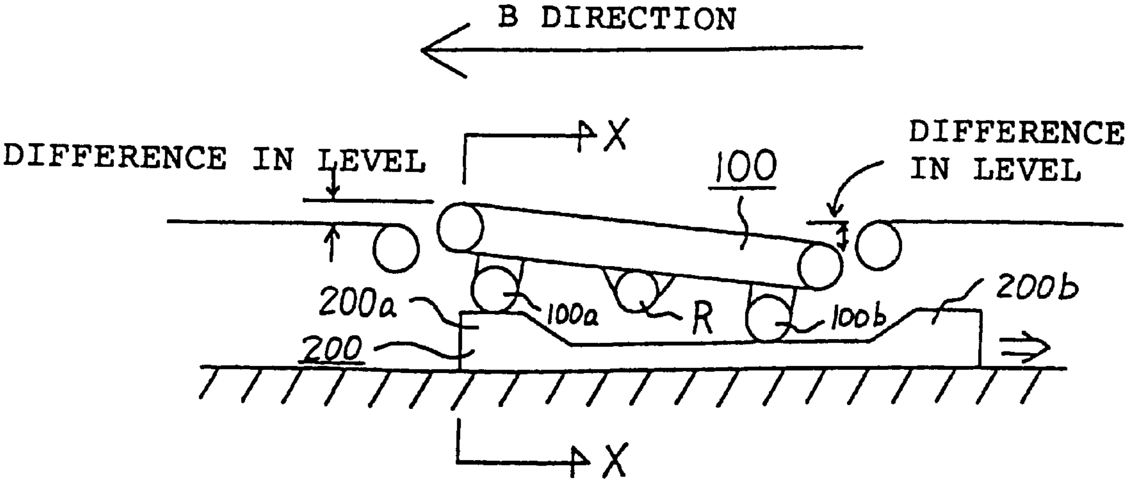
Figure 16:
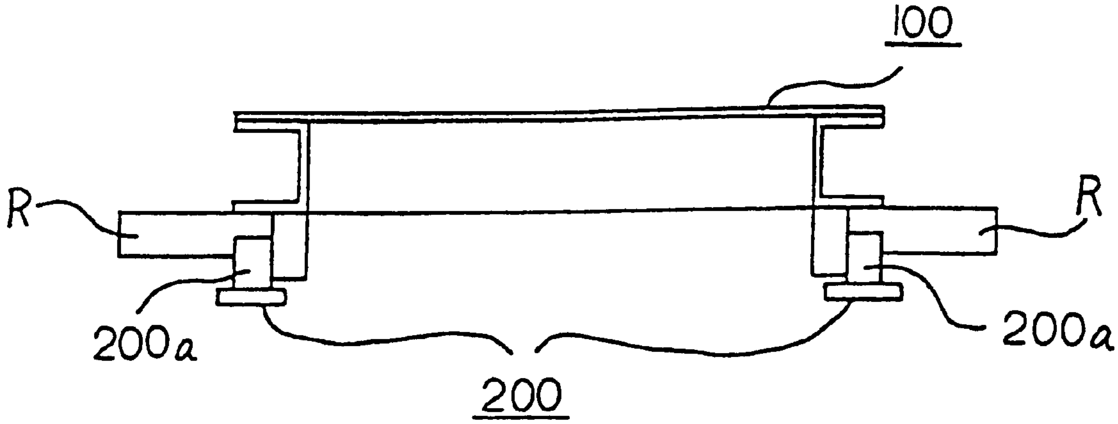
FIG. 16 is a view as seen from a line X—X in FIG. 15(*b*)

Next, another embodiment in accordance with the invention will be described below with reference to the drawings. FIGS. 15(*a*) and (*b*) are views which show a mechanism for finely adjusting the height position of the small diameter roller, FIG. 16 is a view as seen from a line X—X of FIG. 15(*b*), in the drawings, reference numeral 100 denotes a support table for supporting the total module 2, which is rotatably mounted around a support point of an R portion in a center portion, and guide rollers 100*a* and 100*b* are rotatably provided at a downward projecting portion in both ends.

Reference numeral 200 denotes a moving stand provided in a connecting direction of the module 2 in such a manner as to be freely moved by a drive mechanism, for example, a rack and pinion and the like, this has projecting portions 200*a* and 200*b* on both ends, and is structured in such a manner as to guide the guide rollers 100*a* and 100*b* on the upper surface.

Accordingly, in the case that the transfer direction of the passenger is an A direction as shown in FIG. 15(*a*), the support table 100 of the module 2 is set by moving the moving stand 200 in a leftward direction so as to mount the guide roller 100*b* on the projecting portion 200*b*.

Then, the small diameter roller in the sending end of each of the modules 2 is disposed in a high position and the small diameter roller in the receiving end is relatively disposed in a low position, so that the passenger can be transferred in a significantly smooth manner.

On the contrary, in the case that the transfer direction of the passenger is a B direction, which is inverted to the preceding case, as shown in FIG. 15(*b*), the support table of the module 2 is set by moving the moving stand 200 in a rightward direction so as to mount the guide roller 100*a* on the projecting portion 200*a*.

Then, the small diameter roller in the sending end of each of the modules 2 is disposed in a high position and the small diameter roller in the receiving end is relatively disposed in a low position, so that the passenger can be always transferred in a significantly smooth manner as in the same manner as that mentioned above.

Figure 17A:
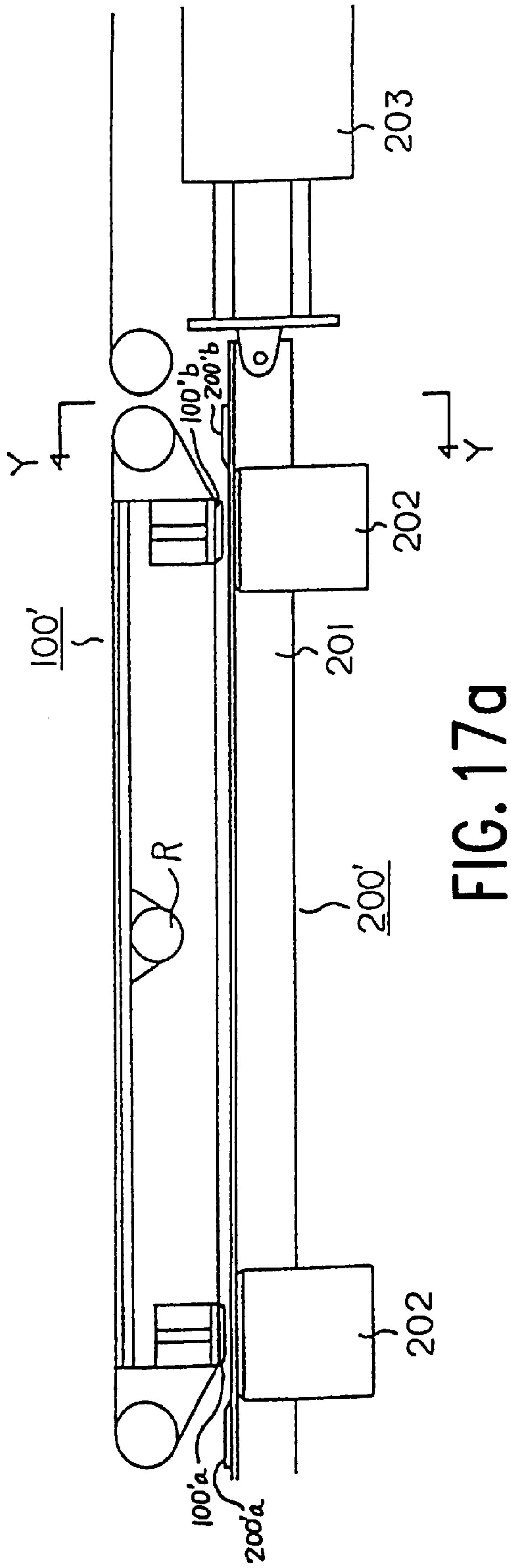
FIGS. 17(*a*) and 17(*b*) are views which show the other mechanism for finely adjusting a height position of the small diameter roller in accordance with the invention.
Figure 17B:
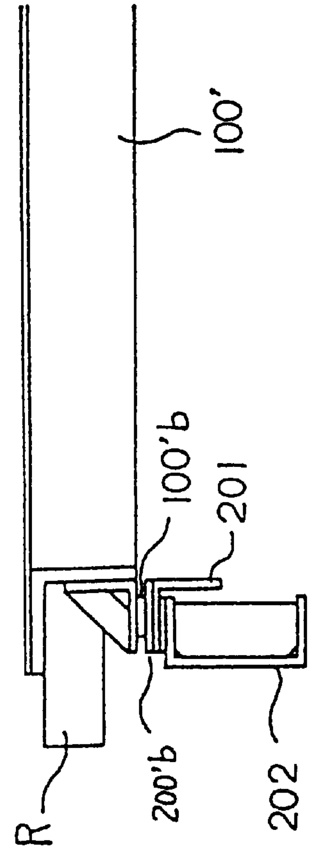

In the explanation mentioned above, an example in which a relative position between the small diameter roller in the sending end and the small diameter roller in the receiving end is changed by adjusting an inclination amount of the support table 100 supporting the module 2 through the guide rollers 100*a* and 100*b* has been mentioned, however, as shown in FIG. 17 (FIG. 17(*b*) is a view as seen from a line Y—Y of FIG. 17(*a*)), even in a simple structure which is structured such that simple sliding member 100'*a* and 100'*b*, for example, made of plastics and the like, is provided on the lower surface of the support table 100', on the contrary, in the moving support body 200', for example, an L-shaped angle 201 is supported by a load support member 202 all between the small diameter rollers of one module 2 in such a manner as to freely move to a longitudinal direction, and that the angle 201 is driven, for example, by a known electric cylinder 203, and that cams 200'*a* and 200'*b* are provided on an upper surface of the angle 201 so as to press up any of the sliding members 100'*a* and 1000'*b* by an engagement between the sliding members 100'*a* and 100'*b* of the support table 100' and the cams 200'*a* and 2000'*b* of the moving support body 200' and to suitably incline the support table 100', no problem is actually produced when a frequency of operating this mechanism is a few.

Figure 18:
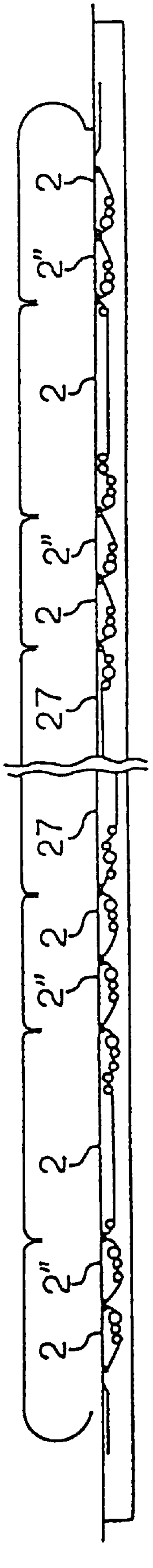
FIG. 18 is an overview which shows an example of an arrangement of an adjustable module 2"

A difference in level between the modules has an important meaning as the circulating speed of the endless sliding belt 20 is slow, and since a difference in level is not required in the area having a fast circulating speed, in the case of the movable speed type moving walk constituted by a plurality of modules 2 and 2" as shown in FIG. 18, for example, it is considered to make a structure capable of adjusting a height of only the module 2". Of course, it does not matter if all the modules 2 and 2" are made in a structure capable of being adjusted.

Figure 19A:
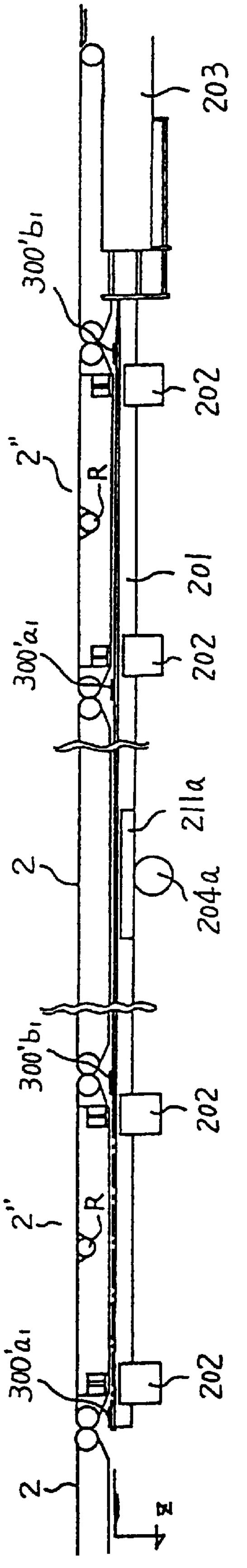
FIGS. 19(*a*) and 19(*b*) are views which show an embodiment in the case that the invention is applied to plural groups of modules.
Figure 19B:
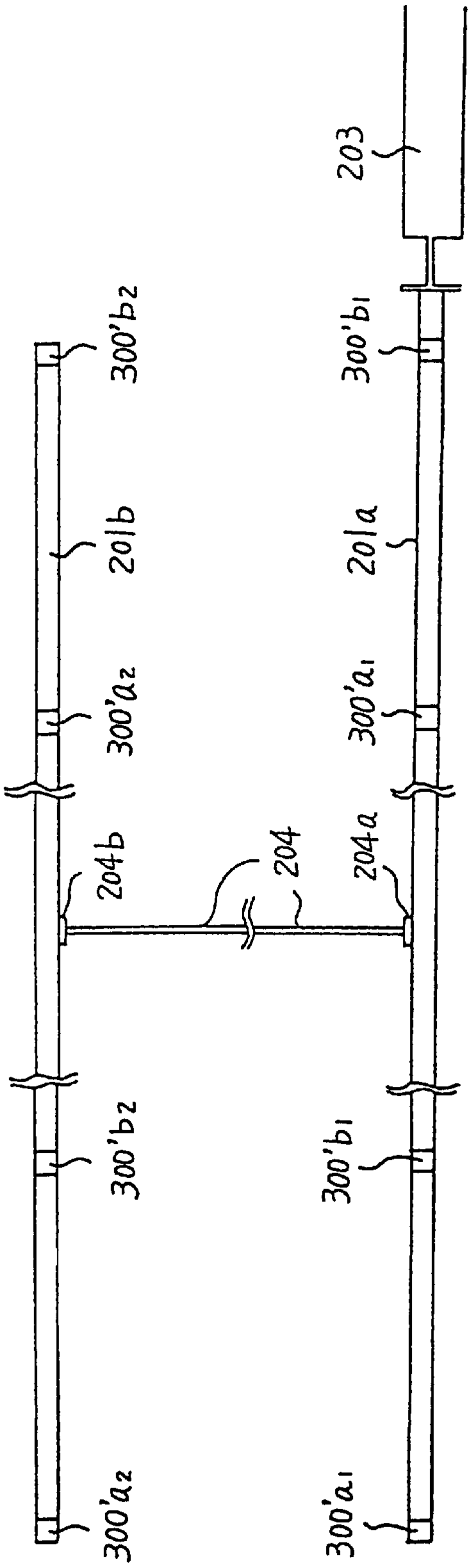

In order to make a plurality of modules of a structure capable of being adjusted in height as mentioned above, as an example, a structure as shown in FIG. 19 is used (FIG. 19(*b*) is a view as seen from a line Z—Z of FIG. 19(*a*)).

In the drawings, the same reference numerals as those of FIG. 17 denote the same elements, however, reference numerals 201*a* and 201*b* denote an angle member separately disposed in both right and left side portions of the endless sliding belt 20, and this is a longitudinal member extending over a plurality of modules 2 and 2".

The angle members 201*a* and 201*b* are slidably supported by the load support member 202 in the same manner as in the case of FIG. 17. Then, the angle member 201*a* is directly driven by the electric cylinder 203.

Reference numeral 211*a* denotes a rack provided in a central portion of the angle member 201*a* and the rack is provided in the angle member 201*b* end in the same manner.

Reference numeral 204 denotes a shaft disposed in such a manner as to extend between the angle members 201*a* and 201*b*, and pinions 204*a* and 204*b* meshed with the rack 211*a* of the angle member 201*a* and the rack of the angle member 201*b* are rotatably mounted to both ends thereof.

Then, cams 300'*a*1, 300'*b*1, 300'*a*2 and 300'*b*2 are provided at a predetermined position of the module for adjusting the height on the upper surface of the angle members 201*a* and 201*b*.

Accordingly, when the electric cylinder 203 is operated so as to move the angle member 201*a* in a necessary direction, that is, a left direction or a right direction of FIG. 19, the angle member 201*b* is also moved in the same direction as that of the angle 201*a* by the rack and pinion mechanism in the central portion, as a result, the cam 300'*b*1 and 300'*b*2, or 300'*a*1 and 300'*a*2 presses upwardly the corresponding sliding member in the support table 100' so that only the predetermined module 2" has a necessary inclination.

As mentioned above, in accordance with this embodiment, the transfer of the passenger from the sending end of each of the modules to the receiving end can be performed in a significantly smooth manner. The moving walk does not produce any problem even when the operating direction is inverted. Further, a safe moving walk in which even when the passenger walks on the belt in a wide stride, the passenger does not stumble or stagger can be obtained.

The moving walk in accordance with the invention can move the passenger at a high speed as mentioned above, and can be operated in the inverted direction. Further, there is a little risk that the passenger stumbles and staggers when the passenger walks on the belt, so that a high safety is achieved. Still further, no particularly complex mechanism is required, and a manufacture can be performed at a relatively low cost. Accordingly, it is suitable for setting in a wide place, for example, an airport.

What is claimed is:

1. A moving walk for effecting transport of a person in a longitudinal direction along a structure, comprising:

first and second belt modules, each including:
- a first end and a second end;
- a endless belt extending from said first end to said second end; and
- a drive circulating said endless belt;

a floor plate disposed in a surface of said structure adjacent at least one of said first end of said first belt module and said second of said second belt module for permiting the person to step from said floor plate onto said at least one of said first end of said first belt module and said second of said second belt module;

said first and second belt modules being serially disposed adjacent one another in the longitudinal direction with said second end of said first belt module opposing said first end of said second belt module;

one of said second end of said first belt module and said first end of said second belt module being disposed higher than another one of said second end of said first belt module and said first end of said second belt module;

said drives of said first and second belt modules operating to effect transport from said one of said second end of said first belt module and said first end of said second belt module to said another one of said second end of said first belt module and said first end of said second belt module;

moving handrails disposed adjacent sides of said first and second belt modules, extending in the longitudinal direction and driven in conjunction with said first and second belt modules, for accepting a hand of the person being transported on said first and second belt modules; and means for moving at least one of said second end of said first belt module and said first end of said second belt module in a vertical direction to a position which is one of above and below another one of said second end of said first belt module and said first end of said second belt module.

2. The moving walk according to claim 1, wherein said means for moving include at least one of said first and second belt modules having a support shaft extending transverse to said longitudinal direction and rotatably supporting said at least one of said first and second belt modules substantially at a center portion to permit pivoting motion whereby said one of said second end of said first belt module and said first end of said second belt module is movable in the vertical direction and selectively disposable to said position which is one of above and below said another one of said second end of said first belt module and said first end of said second belt module.

3. A moving walk as recited in claim 2, wherein said at least one of said first and second belt modules includes:

a guide member on a bottom surface proximate one of said first and second ends; and a movable support body having a projecting portion for selectively engaging said guide member to effect said pivoting of said at least one of said first and second belt modules.

4. The moving walk according to claim 1, further comprising:

said first and second belt modules each having first and second rollers respectively disposed at said first and second ends over which said endless belt circulates; and said means for moving being an actuating means for moving one of said second roller of said first belt module and said first roller of said second belt module in a vertical direction to be selectively disposable said position which is one of above and below another one of said second roller of said first belt module and said first roller of said second belt module such that said one of said second end of said first belt module and said first end of said second belt module is selectively disposable one of higher and lower than said another one of said second end of said first belt module and said first end of said second belt module.

5. A moving walk according to claim 4, wherein said actuating means includes said one of said second roller of said first belt module and said first roller of said second belt module being mounted on a shaft supported eccentrically about an axis of rotation such that said shaft is movable in said vertical direction.

6. The moving walk according to claim 1, wherein said first and second belt modules each have first and second rollers respectively disposed at said first and second ends over which said endless belt circulates.

7. A moving walk as recited in claim 6, wherein said at least one of said first and second belt modules includes:

a guide member on a bottom surface proximate one of said first and second ends; and a movable support body having a projecting portion for selectively engaging said guide member to effect said pivoting of said at least one of said first and second belt modules.

8. The moving walk as recited in claim 3 or 7, wherein said guide member has is a fixed slide surface.

9. The moving walk as recited in claim 3 or 7, wherein said guide member is a roller.

10. The moving walk as recited in claim 3 or 7, wherein:

said support body has an inclined surface for engaging said guide member; and an electric solenoid drives the support body in the longitudinal direction to effect engagement of said inclined surface with said guide member.

11. The moving walk as recited in claim 3 or 7, wherein said support body includes separate support portion separately disposed at said first and second ends and driven by a rack and pinion mechanism.

12. The moving walk as recited in claim 1 or 4, wherein a length of each of said first and second belt modules is at least 800 mm.

13. The moving walk as recited in claim 12, wherein the length of each of said first and second belt modules is the same.

14. The moving walk as recited in claim 12, wherein a transfer time for a body to be transferred in each of said first and second belt modules is the same.

* * * * *